United States Patent [19]
Groen et al.

[11] Patent Number: 5,853,441
[45] Date of Patent: Dec. 29, 1998

[54] PORTABLE MODULAR VACUUM SYSTEM

[76] Inventors: Douglas D. Groen, 913 Cortland Dr., Apple Valley, Minn. 55124; Kenneth W. Witte, 20555 Italy Ave., Lakeville, Minn. 55044

[21] Appl. No.: 770,566

[22] Filed: Dec. 19, 1996

[51] Int. Cl.$^6$ .................................................. B01D 46/00
[52] U.S. Cl. ............................................ 55/350.1; 55/356
[58] Field of Search ..................................... 55/356, 350.1

[56] References Cited

U.S. PATENT DOCUMENTS

| | | | |
|---|---|---|---|
| 4,810,269 | 3/1989 | Stackhouse et al. | 55/356 |
| 4,968,333 | 11/1990 | Ellis et al. | 55/356 |
| 5,069,691 | 12/1991 | Travis et al. | 55/356 |
| 5,433,763 | 7/1995 | Shagott et al. | 55/350.1 |
| 5,588,985 | 12/1996 | Shagoyy et al. | 55/356 |

*Primary Examiner*—John T. Kwon
*Attorney, Agent, or Firm*—Herman H. Bains

[57] ABSTRACT

A portable, modular vacuum collection apparatus includes a prefilter unit, a vacuum generator unit and a final Hepa filter unit which are releasably secured together. The prefilter unit is provided with a plurality of similar tubular flexible filters and the vacuum generator is powered by a variable frequency drive motor for optimizing the performance of the system. The vacuum collection apparatus is readily portable and is effective for use in cleaning and decontamination of HVAC systems.

4 Claims, 2 Drawing Sheets

PORTABLE MODULAR VACUUM SYSTEM

FIELD OF THE INVENTION

This invention relates to a portable modular vacuum collection apparatus for cleaning ducts used in heating, ventilating and air conditioning systems.

BACKGROUND OF THE INVENTION

Negative pressure and/or vacuum systems are available for cleaning and decontamination of residential heating, ventilation and air conditioning systems (HVAC). Some of the commercial systems are large and bulky and difficult to transport. There are smaller portable systems but most of these do not comprise modular arrangements.

SUMMARY OF THE INVENTION

It is an object of this invention to provide a portable modular vacuum apparatus for cleaning and decontamination of HVAC systems.

The apparatus includes three modular units, namely, a prefilter unit, a vacuum generator unit, and a final Hepa filter unit. The units are releasably secured together which permits ready assembly and disassembly of the apparatus for operation or transport. The prefilter and vacuum generator units are provided with castor wheels for easy movement while the final Hepa filter unit is positioned upon the vacuum generator unit. The vacuum generator unit may be operated at 115 or 230 voltage, and a variable frequency drive motor eliminates repeated circuit overloads while permitting optimum performance even when the filters are dirty and clogged.

DESCRIPTION OF THE PREFERRED EMBODIMENT

Figure 1:
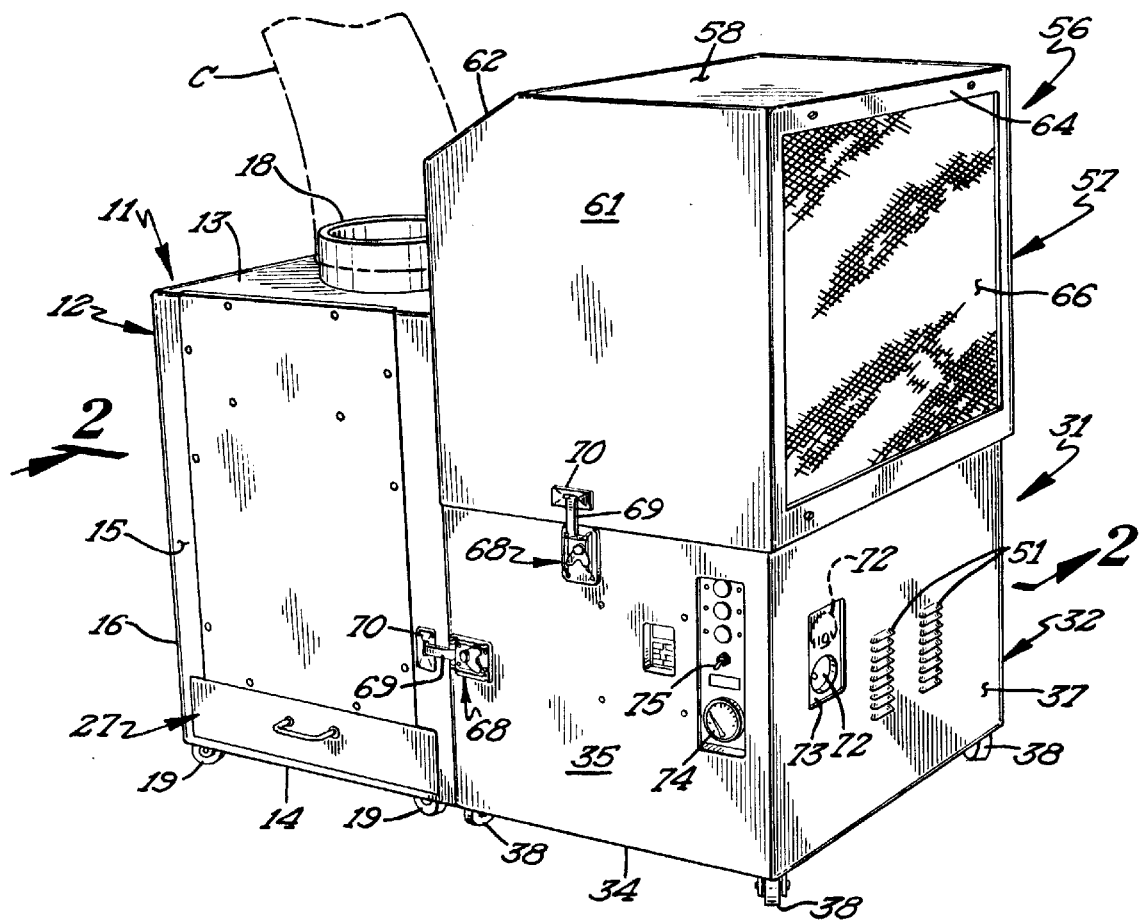
FIG. 1 is a perspective view of the portable, modular vacuum apparatus.
Figure 2:
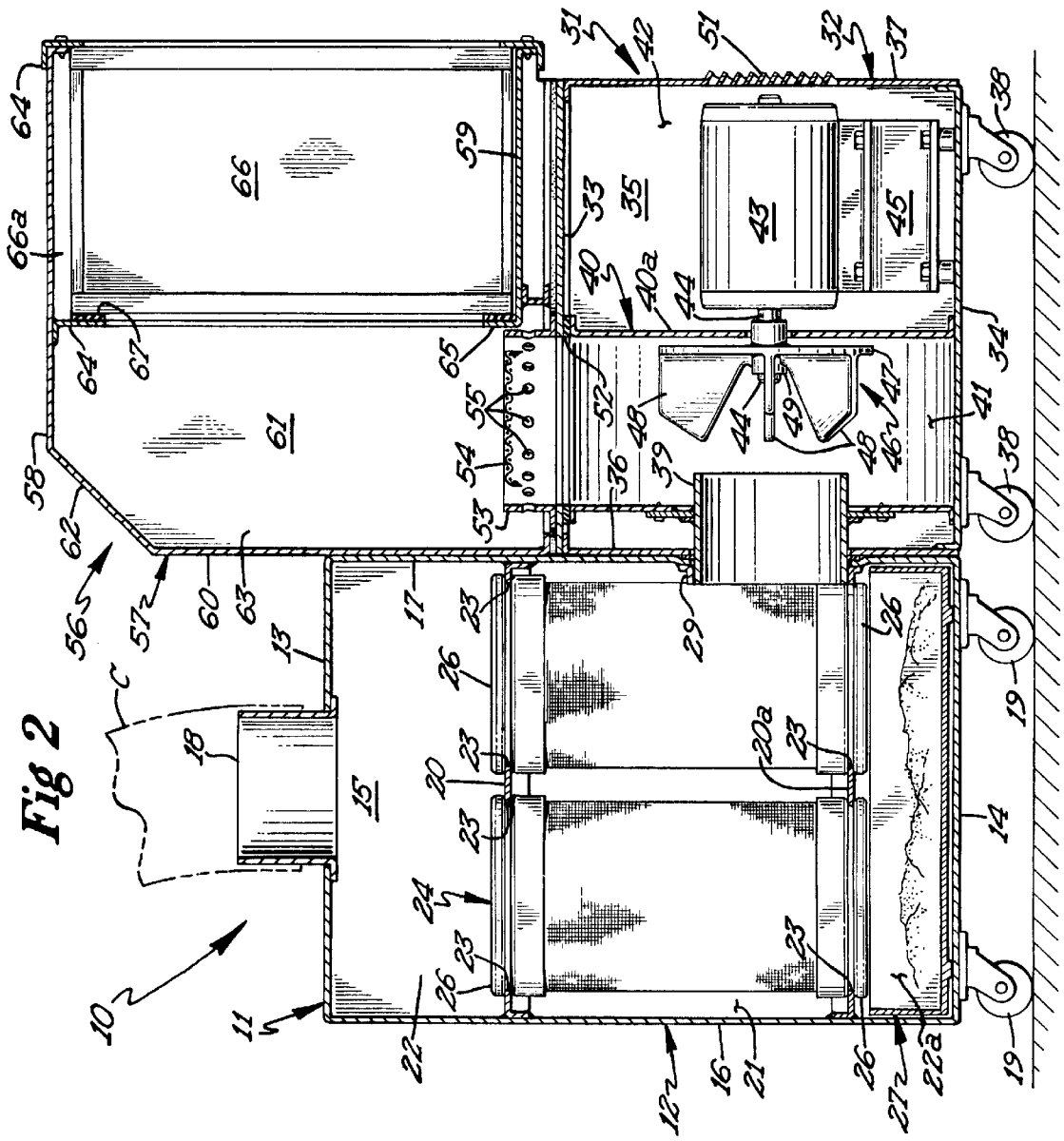
FIG. 2 is a cross-sectional view taken approximately along line 2—2 of FIG. 1 and looking in the direction of the arrows.

Referring now to the drawings, it will be seen that one embodiment of the novel portable modular vacuum collection system, designated generally by the reference numeral 10, is thereshown. The portable modular vacuum collection system 10 includes a plurality of modular units including the rectangular prefilter modular unit 11. The pre-filter modular unit 11 includes a prefilter bag housing 12 which is generally of rectangular or parallel-configuration including a substantially flat rectangular top wall 13, a flat bottom wall 14, opposed upright side walls 15, a front wall 16, and a rear wall 17. The top wall 13 has an inlet opening in the central portion thereof and the inlet opening accommodates an inlet opening fitting 18. A plurality of caster wheels 19 are secured to the bottom wall 14 and project downwardly therefrom. The caster wheels moveably support the pre-filter modular unit 11 but may be locked against movement.

The interior of the bag housing 12 is provided with a transverse top wall 20 and a transverse bottom wall 20a. The transverse top and bottom walls are parallel to each other and are also disposed in parallel relation to the top and bottom walls of the bag housing 12. The volumetric space located between the transverse top and bottom walls defines a filter chamber 21. The space located above the transverse top wall 20 defines a plenum chamber 22 and the space defined below the transverse bottom wall defines a collection chamber 22a.

The transverse top and bottom walls 20, 20a are provided with openings 23 therein and each opening 23 in the top wall is aligned with an opening 23 in the bottom transverse wall 20a. A plurality of open ended vertical bags or tubular filter members 24 extend between and are secured to the transverse top and bottom walls 20, 20a. Each of the vertical bags 24 is made of a flexible air pervious material and each has a pair of flexible mounting members 26 secured to the upward and lower ends thereof. The mounting members 26 for each filter bag 24 are detachably secured respectively in sealing relation to the openings in the upper transverse and lower transverse walls 20, 20a. The filter bags or members 24 may be removed and replaced as required for efficient operation of the prefilter unit.

The collection chamber 22 is provided with an upwardly opening drawer 27 which collects dust and contaminants and may be periodically removed for emptying the drawer. The drawer is slidable into and out of the bag housing 12. The bag housing 12 is also provided with an outlet opening 29 in the rear wall 17 thereof which accommodates a cylindrical outlet fitting 39. It will be noted that the outlet opening and fitting are located adjacent the lower portion of the rear wall 17.

The portable modular vacuum system 10 also includes a vacuum generator modular unit 31 which is comprised of a vacuum generator housing 32. The generator housing 32 is of generally rectangular configuration and includes an upper wall 33, a lower wall 34, opposed side walls 35, a front wall 36 and a rear wall 37. Caster wheels 38 are secured to the lower wall 34 and moveably support the vacuum generator modular unit 31 for movement. The caster wheels may be selectively locked against movement.

The generator housing 32 has a vertical wall 40a extending between the upper wall 33 and lower wall 34 thereof at a location intermediate of the front walls 36 and rear wall 37. This vertical wall 40a forms a wall of a fan housing 40 interiorly of the generator housing 32 and separates the interior of the generator housing into a fan chamber 41 and a motor chamber 42. The front wall 36 has an inlet opening therein which is disposed in aligned relation with the outlet opening 29 in the bag housing 12. The fitting 39 projects through the outlet opening in the bag housing 12 and the inlet opening in the fan chamber 41 to intercommunicate the fan chamber with the filter chamber 21.

A two horsepower variable frequency drive, 230 volt, 3 phase electric motor 43 is positioned in the motor chamber 42 and is supported on a mounting bracket 45 secured to the lower wall of the generator housing 32. The two horsepower motor is provided with an output shaft 44 which projects through the vertical wall 40a and has a radial fan blade 46 secured thereto. The radial fan blade 46 includes a disk 47 secured to a hub 49. The disk has blades 48 that project forwardly therefrom. The blades 48 are arranged radially with respect to the disk 47 and extend radially outwardly from the hub 49. It will be seen that when the two horsepower electric motor is energized, the fan will be operated and will induce a vacuum in the pre-filter bag housing 12. The electric motor 43 is capable of operating at both a 230 volt current or 115 volt current.

The rear wall 37 of the vacuum generator housing 32 has louvered vent openings 51 therein. These vent openings serve to vent the motor chamber 42 to allow heat to dissipate from the motor chamber and motor during operation of the motor. It will also be seen that the generator housing 32 has an opening 52 in the top wall 33 thereof which communicates with the fan chamber 41. An outlet fitting or tube 53 is positioned in the opening to permit air to flow from the fan chamber 41 upwardly through the tube 53. A suitable screen 54 is positioned across the open end of the tube 53 to filter air entrained particles. The tube 53 is also provided with a plurality of circumferentially arranged openings 55 to permit air to flow through these openings.

The portable modular vacuum system 10 also includes a Hepa filter modular unit 56 which is positioned upon the vacuum generator modular unit 31 and is supported thereon. The Hepa filter modular unit 56 includes a Hepa filter housing 57 of generally rectangular configuration including a top wall 58, a lower wall 59, opposed side walls 61, a front wall 60, and an inclined wall 62 extending between and integral with the top wall 58 and front wall 60. The interior of the Hepa filter housing defines a Hepa filter plenum chamber 63 and a filter chamber 66. In this regard, the interior of the Hepa filter housing 57 is provided with angle elements 64 secured to the top wall 58 and angle elements 65 secured to the bottom wall 59. Each angle element 64 is disposed in substantial vertical alignment with an angle element 65. A gasket 67 is secured to the angle elements 64 and 65 and is located between the Hepa filter plenum chamber 63 and the filter chamber 66a.

A Hepa filter 66 is positioned within the filter chamber 66a and serves to filter the air directed through the filter to the exterior.

The various modular units of the portable modular vacuum system are releasably secured together by suitable locking means. For example, a pair of cam locks 68 (only one of this pair is shown) secures the pre-filter modular unit 11 to the vacuum generator modular unit 31. Each cam lock 68 includes a cam locking lever 69 which engages a lever engaging element for locking the modular units together. Another pair of identical cam locks 68 releasbly lock the Hepa filter modular unit 56 to the vacuum generator modular unit 31. When the various modular units are releasably locked together, the units can be moved from location to location as a single entity. Conversely, the units may be readily separated for storage or transportation by simply releasing the cam locks from the locked position and the disengaging the modular units from each other.

The vacuum generator unit has a pair of electrical connector plugs 72 for selective connection to an electrical conductor connected to a source of electrical current. One of the plugs 72 will be connected to a 230 volt electrical current and the other plug will be connected to a 115 volt current. The variable frequency motor 43 can selectively operate at 230 volts or 115 volts. An apertured slide plate 73 is slidable to selectively open one plug 72 while shielding or closing the other plug.

The vacuum generator unit also includes a control panel including an on-off switch 75 which turns the motor 43 on or off. The control panel also includes a magnehelic gauge 74 to display the pressure drop of the Hepa filter 66.

During operation of the modular vacuum collection apparatus 10, a flexible conduit C will have one end thereof connected to the inlet fitting collar 18 of the prefilter unit 11. The flexible conduit or hose C will extend into a duct system to be cleaned. A stream of air entrained debris and contaminants will flow through the conduit C into the prefilter unit 11.

Prior to operation of the apparatus 10, the castor wheels 19 and 38 will be locked against movement thereby immobilizing the apparatus. The motor 43 will be energized to rotate the fan 46 and induce a vacuum into the conduit C. The design of the fan 46 is especially suited to movement of dirt, debris and other contaminants found in the ductwork to be cleaned.

The stream of air entrained debris and contaminants will flow into the plenum chamber 22 of the prefilter bag housing 12 and then downwardly into the tubular filter members 24. The stream of air entrained particles will be directed through the walls of the filter members towards the outlet fitting 29. Debris will be filtered by the filter members 24 and removed from the stream. Some of the debris will fall into drawer 27. In the embodiment shown, six filter members or bags 24 are provided for the filter camber 21.

The stream will then pass into the fan chamber 41 and upwardly through outlet into the plenum chamber 63 of the Hepa filter unit 56. The air will be discharged through the Hepa filter 66 for final removal of contaminants.

The variable frequency drive motor 43 permits optimum performance even the filter members 24 become increasingly clogged. The variable frequency drive for the motor is operable to regain lost performance (when the prefilters become loaded) by increasing the frequency and the rpm of the motor. The variable frequency drive also eliminates repeated circuit overloads because one can reduce the amp draw if the circuit becomes overloaded when the apparatus is first operated. It is also pointed out that the Hepa filter unit 56 may be removed under certain conditions and the apparatus will operate with the prefilter unit and vacuum generator unit.

It will therefore be seen that I have provided a novel portable modular vacuum system which operates at a more efficient level than any heretofore known comparable device.

What is claimed is:

1. A portable modular duct cleaning apparatus for cleaning heating, ventilating and air conditioning systems comprising;

a modular vacuum generator unit comprising a housing, a vertical wall in said housing defining the housing interior into a fan chamber and a motor chamber and having an inlet and an outlet, a fan in said fan chamber and a variable frequency drive motor in said motor chamber operatively connected to said fan for driving said fan to cause air to flow into the inlet in the fan housing and through said outlet, castor wheels supporting said vacuum generator unit for movement along a surface, a modular Hepa filter unit including a housing having an inlet and outlet, said filter housing having a plenum chamber and a filter chamber, a Hepa filter positioned in said filter chamber, said filter housing positioned upon the vacuum generator housing, means releasably securing the Hepa filter unit to said vacuum generator unit, the inlet of said Hepa filter housing being disposed in communicating relation with the outlet of said vacuum generator housing so that air will flow through the inlet of the Hepa filter housing from the outlet of the vacuum generator housing, a modular prefilter unit including a housing having an inlet and outlet, means releasably securing said modular prefilter unit to said vacuum generator unit, said prefilter housing having a pair of vertically spaced apart apertured transverse walls traversing the interior thereof and forming the interior of said prefilter housing into an upper plenum chamber, an intermediate filter chamber and a lower collection chamber, said inlet of the prefilter housing communicating directly with the upper plenum chamber, said outlet of the prefilter housing communicating directly with the intermediate filter chamber, a plurality of similar vertically disposed open ended flexible tubular filter members positioned within said filter chamber, means securing the upper and lower end portions of the tubular filter members in the apertures of transverse walls, said transverse walls whereby said tubular members directly intercommunicate the plenum chamber, filter chamber, and collection chamber, said prefilter housing having a fitting secured to said inlet for connection to a conduit extending into a duct system to be cleaned whereby when said motor is energized a stream of entraining debris, dust and contaminants is directed into the upper plenum chamber and then into the intermediate filter chamber through the prefilter housing filters and then into the fan housing and thereafter through the Hepa filter for removing impurities and debris from the air stream.

2. The apparatus as defined in claim 1 wherein said fan includes a circular disk connected to a hub, a plurality of flat fan blades being integral with one surface of the disk and extending radially outwardly from the hub.

3. The apparatus as defined in claim 2 wherein said motor is a variable frequency drive motor.

4. The apparatus as defined in claim 1 wherein said prefilter housing is of generally rectangular configuration said housing including a top wall, a bottom wall, a front wall, a rear wall and side walls, said inlet opening being located in said top wall.

* * * * *